(12) United States Patent
Ha

(10) Patent No.: US 6,559,552 B1
(45) Date of Patent: May 6, 2003

(54) RAIN, WIND, WAVE, AND SOLAR ENERGY 4-IN-1 ELECTRIC GENERATING INSTALLATION

(76) Inventor: Siu Kwong Ha, 119A Tai-Chung Hau, Lot 75, DD219 Sai Kung N.T. (HK)

(*) Notice: Subject to any disclaimer, the term of this patent is extended or adjusted under 35 U.S.C. 154(b) by 0 days.

(21) Appl. No.: 09/786,707
(22) PCT Filed: Sep. 28, 1998
(86) PCT No.: PCT/IB98/01504
 § 371 (c)(1),
 (2), (4) Date: Jul. 2, 2001
(87) PCT Pub. No.: WO00/19093
 PCT Pub. Date: Apr. 6, 2000
(51) Int. Cl.[7] ................................................. F03D 9/00
(52) U.S. Cl. .............................. 290/54; 290/55; 415/2
(58) Field of Search ............................... 290/1 R, 1 A, 290/54, 55; 415/2

(56) References Cited

U.S. PATENT DOCUMENTS

| 5,471,098 A | * | 11/1995 | Asay | 290/53 |
|---|---|---|---|---|
| 5,510,656 A | * | 4/1996 | Wells | 290/42 |
| 5,549,445 A | * | 8/1996 | Schremp | 415/2.1 |
| 5,734,202 A | * | 3/1998 | Shuler | 290/1 R |
| 6,016,015 A | * | 1/2000 | Willard, Jr. | 290/54 |
| 6,097,104 A | * | 8/2000 | Russell | 290/1 R |
| 6,100,600 A | * | 8/2000 | Pflanz | 290/4 R |

* cited by examiner

Primary Examiner—Nicholas Ponomarenko
(74) Attorney, Agent, or Firm—Leydig, Voit & Mayer, Ltd.

(57) ABSTRACT

The rain, wind, wave, and solar energy 4-in-1 electric generating installation comprises mainly a wind wheel (2), a water wheel (3) two solar plates (1 and 1A), a wind and current plate (4), a turntable (6), and four floats (14). All these components work in combination to convert 4 natural resources, namely rain, wind, waves, and sunlight into useful electricity with automatic adjustment to the level of tide, and direction of wind and current. The installation can be used either in water or, with some minor modifications, on land. By means of this installation, even without 1, 2, or 3 of the 4 natural resources, generation of electricity will not be suspended. The invention, therefore, has great advantages over the conventional electric generators.

3 Claims, 5 Drawing Sheets

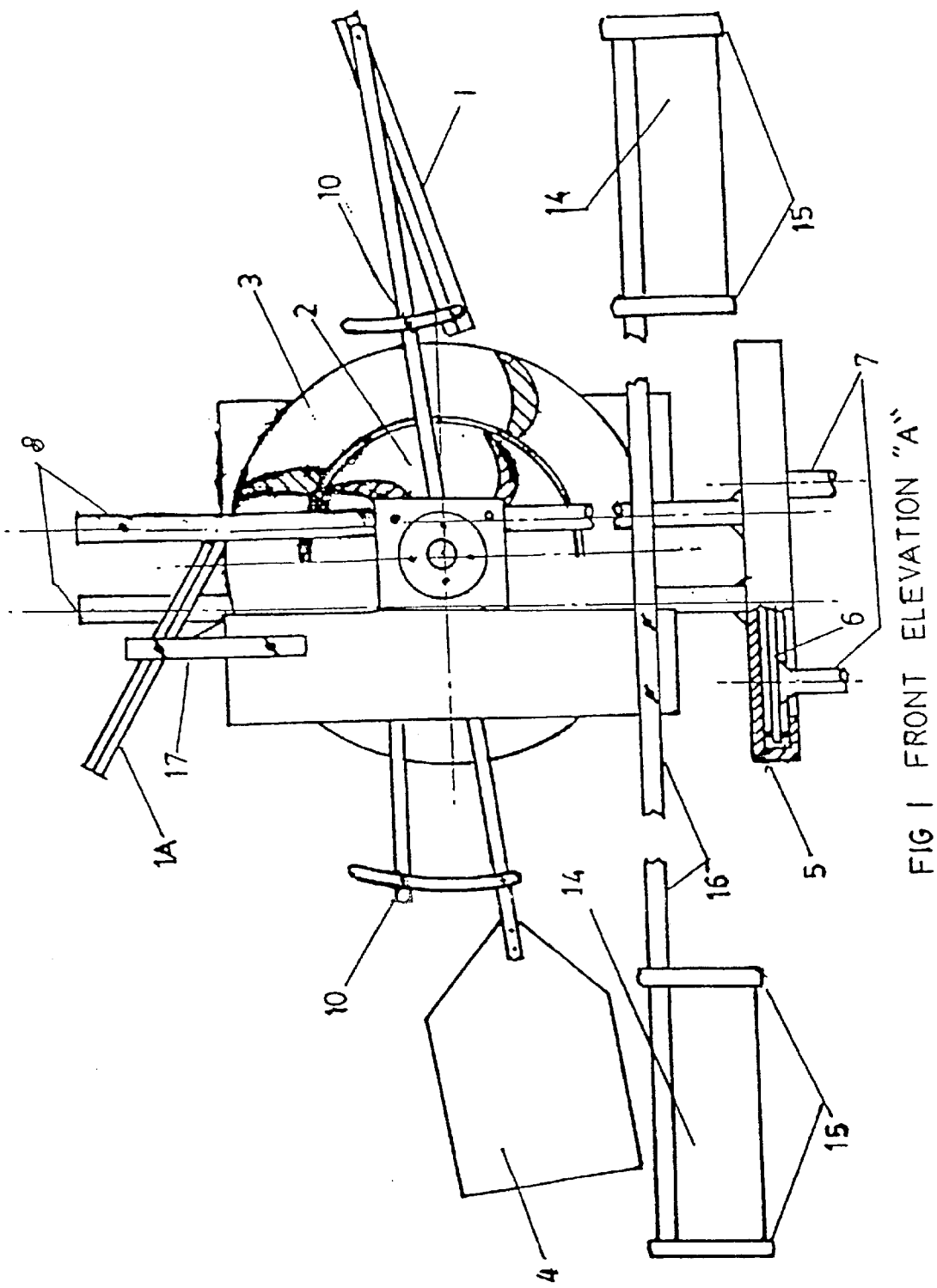

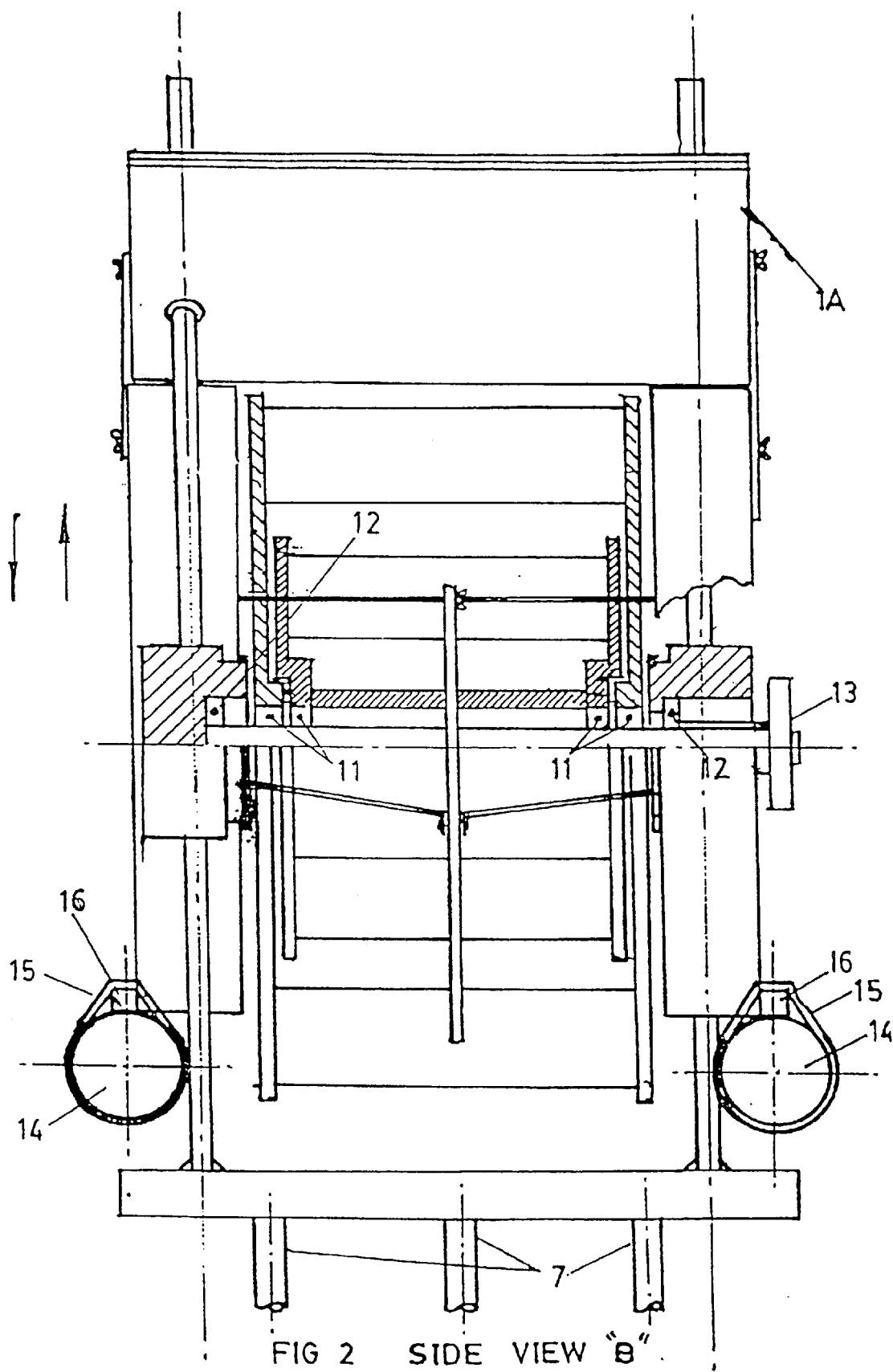
FIG 2 SIDE VIEW "B"

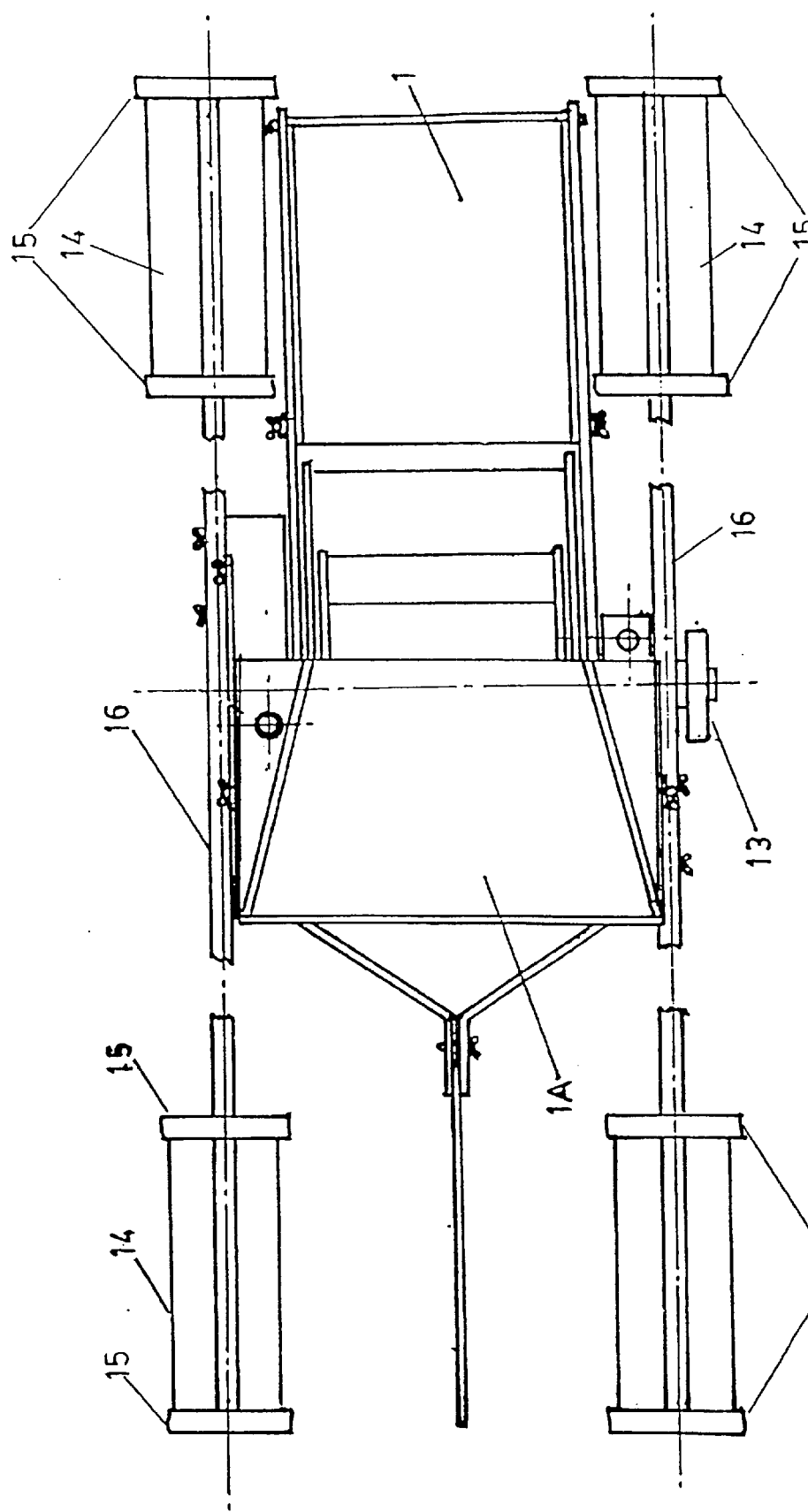
FIG 3 PLAN "C"

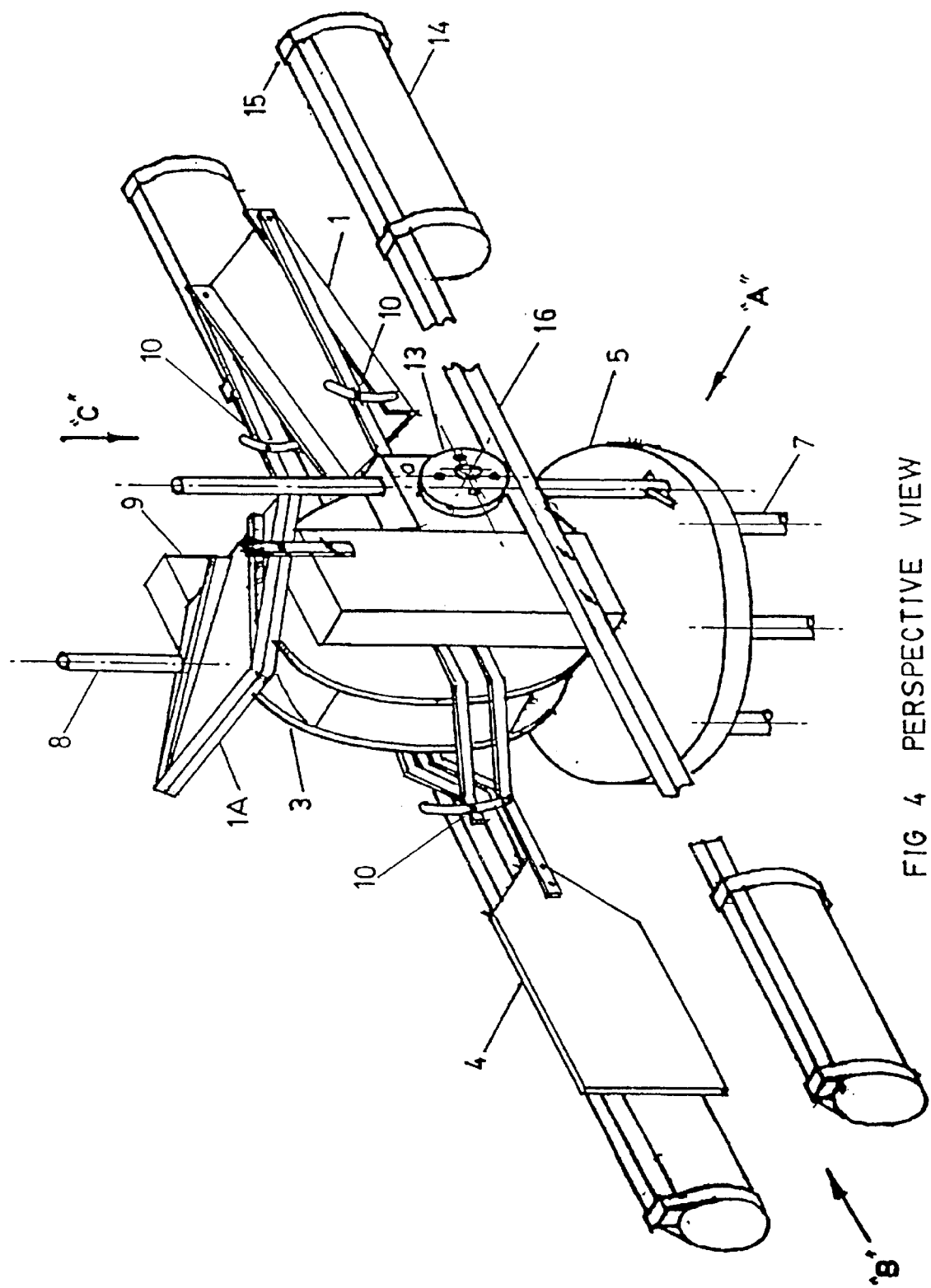
FIG 4 PERSPECTIVE VIEW

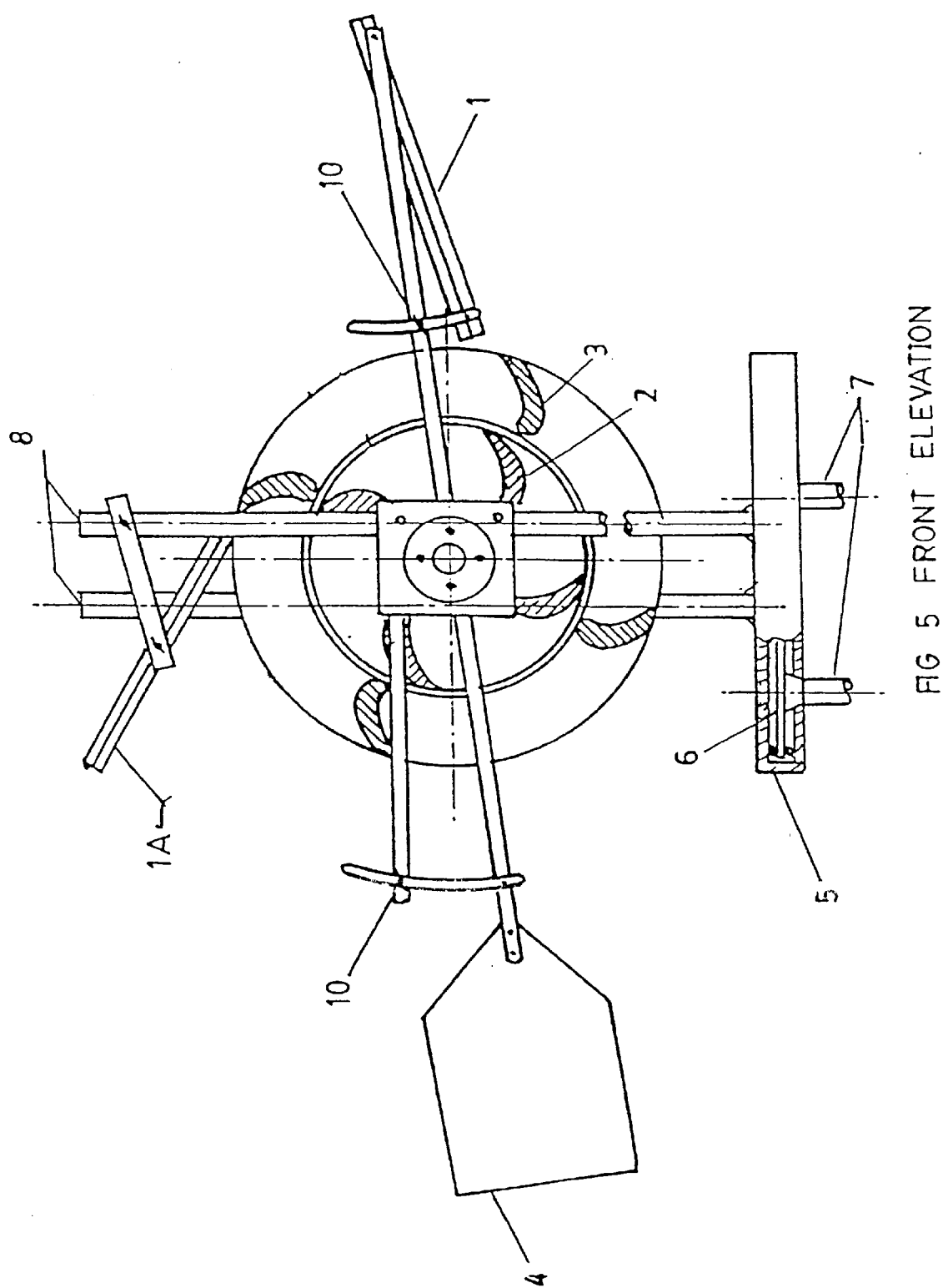
FIG 5 FRONT ELEVATION

RAIN, WIND, WAVE, AND SOLAR ENERGY 4-IN-1 ELECTRIC GENERATING INSTALLATION

TECHNICAL FIELD

This invention relates to a rain, wind, wave, & solar energy 4-in-1-electric generating installation.

BACKGROUND ART

In our everyday life, we use a lot of electric power. It in normally produced by a conventional electric generator using the hazardous neuclear energy, the polluting fuel-burning, wind energy, or water power with a relatively low overall efficiency. Moreover, the generation of electricity will suspend if the source of energy it uses becomes unavailable.

DISCLOSURE OF INVENTION

This invention overcomes the problem with the aid of an electric generating installation which uses 4 natural resources, namely rain energy, wind energy, wave energy, and solar energy in combination resulting in a highly raised overall efficiency. Furthermore, generation of electricity will not suspend even if 1, 2, or 3 of the 4 natural resources becomes unavailable.

BRIEF DESCRIPTION OF DRAWINGS

A specific enbodiment of the invention will now be described by way of example with reference to the accompanying drawings in which:

FIG. 1 shows the front elevation of a 4-in-1 electric generating installation for use in water, FIG. 2 shows a side view of the installation with the top half in section, FIG. 3 shows a plan of the installation, FIG. 4 shows a perspective of the installation, an FIG. 5 shows the front elevation of a 3-in-1 electric generating installation for use on land.

BEST MODE FOR CARRYING OUT THE INVENTION

Referring to the 5 drawings attached, the 4-in-1 electric generating installation for use in water comprises a rotor having a wind wheel (2) and a water wheel (3) mounted on a shaft via single-direction bearings (11). The shaft rotates freely via 2-direction bearings (12) on two supports which slide up and down guide rods (8) to suit different tide level as determined by the action of the floats attached to the supports. The guide rods are firmly fixed onto a turntable (5). The turntable is rotated on bearings over a fixed-horizontal base plate (6) by the action of a wine and current plate (4) until the set-up is facing the wind and waves directly to the best advantage. The base plate has three legs deeply and rigidly driven into the seabed. When sunlight appears, it is immediately collected and converted into electricity on solar plates (1) and (1A) whose top surface is composed of silicon batteries, and the bottom surface, of temperature-sensitive bi-metal batteries. Meanwhile, wind and rain drops are collected on the solar plates, and diverted towards the wind wheel making it turn. Waves striking against the water wheel also make it turn. So all components work in harmony to generate electricity with greatly improved overall efficiency.

If components (9), (14), (15), (16) are removed and component (17) re-fixed with its lower and secured to the top of rod (8), the set-up is modified to a 3-in-1 electric generating installation for use on land as shown in FIG. 5.

INDUSTRIAL APPLICABILITY

The invention is applicable in all situations and under all circumstances where electricity is used, e.g. car manufacturing factories, chemicals producing plants, machine workshops, oil-wells, and oil refineries, etc. The work site location determines whether 4-in-1 or 3-in-1 electric generating installations should be appropriately used.

| | |
|---|---|
| 1, 1A | Solar plate |
| 2 | Wind wheel |
| 3 | Water wheel |
| 4 | Wind and current plate |
| 5 | Turntable |
| 6 | Base plate |
| 7 | Leg |
| 8 | Guide rod |
| 9 | Attachment box |
| 10 | Adjusting wing nut |
| 11 | 1-direction bearing |
| 12 | 2-direction bearing |
| 13 | Coupling for generator |
| 14 | Float |
| 15 | Fastening strap |
| 16 | Float rod |
| 17 | Solar plate fixing rod |

What is claimed is:

1. A 4-in-1 electric generating installation, which uses 4 natural resources, namely rain, wind, wave, and solar energy for the generation of electricity and is suitable for use in water comprises:

a wind wheel (2);

a water wheel (3);

a shaft with two single-direction bearings (11);

two solar plates (1) and (1A);

a wind and current plate (4);

four floats (14);

a turntable (5);

a base plate (6) and three legs (7).

2. A 4-in-1 electric generating installation as stated in claim 1, with components (9), (14), (15), (16) removed, and component (17) re-fixed with its lower and secured to the top of guide rod (8) so as to convert the set-up into a 3-in-1 electric generating installation suitable for use on land using only 3 natural resources, namely rain, wind, and solar energy.

3. A 4-in-1 electric generating installation as stated in claim 1, with modified installation comprising two wind and water wheels (19);

two solar plates (18);

an attachment box (24);

a guide rod (22);

a base plate (21);

a wind and current plate (20);

a float (28) and two wave guide plates (30).

* * * * *